(12) United States Patent
Mueller

(10) Patent No.: US 11,271,454 B2
(45) Date of Patent: Mar. 8, 2022

(54) ACTUATOR FOR ACTIVE MOVEMENT AND DAMPED COUNTER MOVEMENT AND OBJECT ASSEMBLY HAVING AN ACTUATOR

(71) Applicant: DIEHL AVIATION LAUPHEIM GMBH, Laupheim (DE)

(72) Inventor: Bjoern Mueller, Hamburg (DE)

(73) Assignee: Diehl Aviation Laupheim GmbH, Laupheim (DE)

( * ) Notice: Subject to any disclaimer, the term of this patent is extended or adjusted under 35 U.S.C. 154(b) by 259 days.

(21) Appl. No.: 16/653,043

(22) Filed: Oct. 15, 2019

(65) Prior Publication Data

US 2020/0119618 A1    Apr. 16, 2020

(30) Foreign Application Priority Data

Oct. 12, 2018   (DE) .................... 10 2018 008 077.4

(51) Int. Cl.
| | |
|---|---|
| H02K 7/18 | (2006.01) |
| F16H 55/22 | (2006.01) |
| F16K 31/04 | (2006.01) |
| H02K 33/00 | (2006.01) |
| B62D 1/181 | (2006.01) |
| F16H 61/32 | (2006.01) |

(Continued)

(52) U.S. Cl.
CPC ........... *H02K 7/1876* (2013.01); *B62D 1/181* (2013.01); *F16D 23/00* (2013.01); *F16D 28/00* (2013.01); *F16H 19/02* (2013.01); *F16H 55/22* (2013.01); *F16H 61/32* (2013.01); *F16K 31/047* (2013.01); *H02K 33/00* (2013.01)

(58) Field of Classification Search
CPC ...... H02K 7/1876; H02K 33/00; B62D 1/181; F16D 23/00; F16D 28/00; F16H 19/02; F16H 55/22; F16H 61/32; F16K 31/047
See application file for complete search history.

(56) References Cited

U.S. PATENT DOCUMENTS 9,174,517 B2 * 11/2015 Scheuring ................ B60J 5/047
9,461,532 B2 * 10/2016 Sakai ..................... H02K 49/06
(Continued)

FOREIGN PATENT DOCUMENTS

| DE | 102017127859 A1 | 5/2019 |
| WO | 2019101538 A1 | 5/2019 |

*Primary Examiner* — David M Fenstermacher
(74) *Attorney, Agent, or Firm* — Laurence A. Greenberg; Werner H. Stemer; Ralph E. Locher

(57) ABSTRACT

An actuator producing an active movement between fastening elements of the actuator and damping a counter movement contains a main body having a first fastening element, an actuating body movable relative to the main body along an axial direction and having a second fastening element, and an electric motor for actively driving the actuating body exclusively in a driving direction along the axial direction and for passively damping a counter movement of the actuating body counter to the driving direction being brought about by external action on the fastening elements. An object assembly contains an object and the actuator in which the spring element is structurally separate from the rest of the actuator, and an interaction between the spring element and the rest of the actuator is achieved in an object to be operated by the actuator, at least in a correctly mounted state of the actuator.

11 Claims, 2 Drawing Sheets

(51) Int. Cl.
  *F16D 28/00*    (2006.01)
  *F16D 23/00*    (2006.01)
  *F16H 19/02*    (2006.01)

(56) References Cited

U.S. PATENT DOCUMENTS

| | | | | |
|---|---|---|---|---|
| 9,473,011 | B2* | 10/2016 | Sakai | E05F 15/622 |
| 10,180,169 | B2* | 1/2019 | Strobel | F16D 63/002 |
| 10,626,652 | B2* | 4/2020 | Wolker | E05F 15/614 |
| 10,900,270 | B2* | 1/2021 | Takizawa | B60J 5/10 |
| 11,015,378 | B2* | 5/2021 | Fees | E05F 5/00 |
| 11,067,155 | B1* | 7/2021 | Heiberger | F16H 25/20 |
| 2014/0224045 | A1 | 8/2014 | Kummer | |
| 2015/0040698 | A1* | 2/2015 | Kessler | E05F 15/60 |
| | | | | 74/89 |
| 2015/0222169 | A1* | 8/2015 | Sakai | H02K 49/106 |
| | | | | 310/93 |
| 2017/0145727 | A1* | 5/2017 | Yamagata | E05F 15/611 |
| 2017/0362876 | A1* | 12/2017 | Ishikawa | H02K 5/14 |
| 2018/0080532 | A1* | 3/2018 | Oster | E05F 15/622 |
| 2018/0216390 | A1* | 8/2018 | Takizawa | B60J 5/10 |
| 2019/0211604 | A1* | 7/2019 | Scheuring | E05F 15/70 |
| 2019/0277076 | A1* | 9/2019 | Takizawa | E05F 15/622 |

\* cited by examiner

ACTUATOR FOR ACTIVE MOVEMENT AND DAMPED COUNTER MOVEMENT AND OBJECT ASSEMBLY HAVING AN ACTUATOR

CROSS-REFERENCE TO RELATED APPLICATION

This application claims the priority, under 35 U.S.C. § 119, of German Patent Application DE 10 2018 008 077.4, filed Oct. 12, 2019; the prior application is herewith incorporated by reference in its entirety.

BACKGROUND OF THE INVENTION

Field of the Invention

The invention relates to an actuator for producing an active movement between two fastening elements of the actuator and for damping a counter movement. The invention also relates to an object assembly including the actuator and an object.

There is a known practice of opening or closing movable elements, e.g. pivoted elements such as doors or flaps, manually in a certain direction. Spring-damper elements then return the element to the initial position by a movement in the counter direction.

Known motorized devices decouple a motorized opening (or closing) methodology in one direction from a return movement in the counter direction, e.g. by using a spring-damper element, through the use of a number of components.

SUMMARY OF THE INVENTION

It is accordingly an object of the invention to provide an actuator for active movement and damped counter movement and an object assembly having an actuator, which overcome the hereinafore-mentioned disadvantages of the heretofore-known actuators and assemblies of this general type and which assist corresponding movements in an improved way.

With the foregoing and other objects in view there is provided, in accordance with the invention, an actuator which serves to produce an active movement between two fastening elements of the actuator. The actuator also serves to damp a counter movement, i.e. a movement in the direction counter to the active movement.

The actuator contains a main body having one of the two fastening elements, namely the first fastening element. The actuator furthermore contains an actuating body. This actuating body can be moved relative to the main body along an axial direction. The actuating body has the other of the fastening elements, namely the second fastening element.

The actuator contains an electric motor. The motor is configured, in particular by circuit configuration, structural features, programming or a control system constructed for this purpose, to actively drive the actuating body exclusively in a driving direction along the axial direction. The motor is also configured to passively damp a counter movement of the actuating body counter to the driving direction, with the counter movement being brought about by the action of a force on the actuating element, in particular the action of an external force on the fastening elements. For this purpose, the motor is, in particular, firmly coupled in terms of motion in both directions of movement to the actuating element.

In this case, the "motor" contains, in particular, an electric motor per se but also additional components, in particular transmission components, shafts, bearings, control electronics/circuit elements. The "motor" can therefore also be interpreted as a "motor unit."

According to the invention, there is the resulting advantage that both the driving of the active movement in one direction of movement and the passive damping of a counter movement which is not caused by the motor are accomplished by using the motor within the actuator, and respective separate elements are not required for this purpose. Overall, a compact and functionally integrated actuator is obtained in this way.

The actuator or actuator system allows the movement of movable components, in particular pivoted parts, e.g. the movement of a flap or door, relative to a fixed part. The actuator allows a linear motion along the axial direction which causes the (pivoting/door/flap) movement. In this case, the actuating body (and the above-mentioned components, such as a transmission, etc.) is (are) driven actively by the motor per se. In this configuration, a corresponding mechanism (in particular, a non-self-locking mechanism, see below) including, in particular, a motor (unit) and a transmission, is actively driven.

The overall mechanism and thus also the motor (or a motor unit) is operated passively, in particular as a generator, during the return movement, which is not caused by the motor (being, in particular, spring-driven, see below), and damps the movement counter to the driving direction or counter movement. The invention allows operation without electric power, thereby also making it possible to drive safety-critical systems.

In a preferred embodiment, the damping of the counter movement can be set in the motor. In this case, setting takes place in the motor itself or in an element interacting with the motor, e.g. a variable load resistor. The intensity of damping can thus be adapted as required—in particular by a control unit.

For the counter movement, the motor in a preferred embodiment is constructed as an electric-motor brake for damping the movement. Thus, the motor alone already performs the dual function of "driving in the driving direction" and "damping of the counter movement counter to the driving direction." Additional damping components can thus be avoided.

For the counter movement, the motor in a preferred variant of this embodiment is constructed as a resistance brake. The corresponding braking energy is converted predominantly into heat. In particular, the heat is dissipated into the environment. A corresponding system is very simple and requires little maintenance. The damping, i.e. the degree of damping, can be set or varied in a particularly simple manner by changing the resistance.

In a preferred embodiment, the actuator contains a spring element (return spring), which can be loaded by the movement of the actuating body in the driving direction in order to preload the actuating body in the counter direction. During the motor-operated actuating process in the driving direction, mechanical energy is thus stored in the spring element. This return spring allows the subsequent mechanical return of the movable component, i.e. of the actuating body and, in particular, of components coupled thereto in terms of motion.

In a preferred embodiment, the spring element is a structurally separate element from the rest of the actuator. An interaction between the spring element and the rest of the actuator is achieved at least when the actuator (spring element and rest of the actuator) is (are) mounted in or on an object in a correctly mounted state of the actuator. In this case, this is to be driven by the actuator, or a movement of the object is to be damped by the actuator. The actuator thus forms a modular configuration, in particular a kit, including the spring element and the rest of the actuator. In this case, the actuator is matched to the object, in particular according to the "lock and key principle." In particular, the interaction is achieved exclusively in the mounted state, i.e. only appropriate mounting gives rise to the corresponding interaction. In other words, the spring element brings about the return force on the actuator at least in the mounted state. This is then accomplished by the action of a force on the fastening elements.

In particular, the object has a fixed part and a moving part, e.g. a pivoted part, which is to be moved relative to the fixed part by the actuator. The motorized and damping part of the actuator is then mounted between the fixed part and the moving part with the aid of the fastening elements in order to accomplish the driving of the moving part and the damping thereof during the counter movement. As a separate part, the spring element is, in particular, mounted in such a way that it applies an appropriate spring force between the fixed part and the moving part and that it thus applies an appropriate spring force to the fastening elements. The spring element (return spring) can, in particular, be embodied as a torsion spring in a pivoting hinge between the fixed part and the pivoted part.

In an alternative embodiment, the spring element is an element integrated into the rest of the actuator. The spring element then forms an integrated actuator together with the rest of the actuator. In this case, the spring element (return spring) can, in particular, be embodied as a compression spring in the rest of the actuator and is subjected to pressure or compressed when the actuating body is moved in the driving direction.

In a preferred embodiment, the spring element can therefore be subjected to compressive stress by a movement in the driving direction. Particularly in a linear actuator, a corresponding compression spring can be integrated in a particularly advantageous manner, e.g. as a helical spring.

In a preferred embodiment, the actuating body contains or is a threaded rod or spindle with a thread, and the actuator contains a drive element with a mating thread for the thread, which is coupled in terms of motion to the threaded rod and the motor, wherein the thread and the mating thread are of non-self-locking construction. This makes it possible for the actuator to be returned counter to the driving direction by the action of forces on the actuating body or on the fastening elements. In particular, this makes it possible to drive the motor externally during the counter movement, thus enabling it to be used passively as a braking element.

With the objects of the invention in view, there is also provided an assembly which contains the actuator according to the invention, in which the spring element is a structurally separate element from the rest of the actuator, and the object mentioned in this context.

The object assembly and at least some of the embodiments thereof, as well as the respective advantages, have already been explained, with the necessary changes, in the context of the actuator according to the invention.

In particular, the above-mentioned mutual matching of the components is implemented in the object assembly.

In a preferred embodiment, the object contains a fixed part and a pivoted part, which is pivotable relative to the fixed part about a pivoting axis, wherein one of the fastening elements is attached to the fixed part and the other fastening element is attached to the pivoted part. The use of the actuator according to the invention is particularly suitable for a corresponding pivoting configuration.

In a preferred variant of this embodiment, the spring element is mounted in such a way as to engage on the fixed part and the pivoted part in order to preload the latter, during the movement of the actuator in the driving direction, in a pivoting direction corresponding to the counter direction. Thus, a movement in the counter direction or at least assistance of the movement in the counter direction by a force is ensured at all times, even if the motor component of the actuator fails or is absent.

The invention is based on the following insights, observations and considerations and also has the following embodiments. In this context, the embodiments are also referred to in some cases as "the invention" by way of simplification. In this case, the embodiments can also contain parts or combinations of the above-mentioned embodiments or can correspond thereto and/or may also include embodiments not previously mentioned.

The invention is based on the basic concept of implementing a modular combination of both functions (driving in the driving direction/damping in the counter direction) in one component or actuator.

The invention allows motorized movement of movable components (e.g. of the above-mentioned pivoted part). The return movement takes place, in particular, in a spring-driven manner (spring element) and is made possible by the use of a non-locking mechanism. According to the modular concept of the actuator, the actuator includes, in particular, a linear actuator which contains the motor unit (motor) and a non-self-locking mechanism. It is possible for a return spring to be integrated into the actuator but also into or onto the movable component to be moved. In particular, the actuator is controlled by a control unit.

Injury to people by trapping can be prevented by monitoring the motor current (the motor current bears a linear relationship to the torque and hence to the trapping force). A manual override can be detected and the electric movement disabled.

According to the invention, therefore, a motor-driven actuator with automatic independent spring return and damping for opening and closing movable components is obtained.

In contrast with the prior art known in practice, in which manual return mechanisms, e.g. spring-damper elements, are used, the actuator according to the invention is distinguished by motorized opening.

In comparison with motorized devices, the actuator according to the invention is distinguished by the integration of the functions of a motorized movement in the driving direction (e.g. opening) and an unpowered damped counter movement (e.g. closing), which continues to allow manual usage. These advantages enhance the perceived convenience of operation since the moving parts now no longer have to be touched. The integrative, compact construction results in reduced component costs. Integration within the smallest installation spaces is furthermore made possible.

Other features which are considered as characteristic for the invention are set forth in the appended claims.

Although the invention is illustrated and described herein as embodied in an actuator for active movement and damped counter movement and an object assembly having an actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
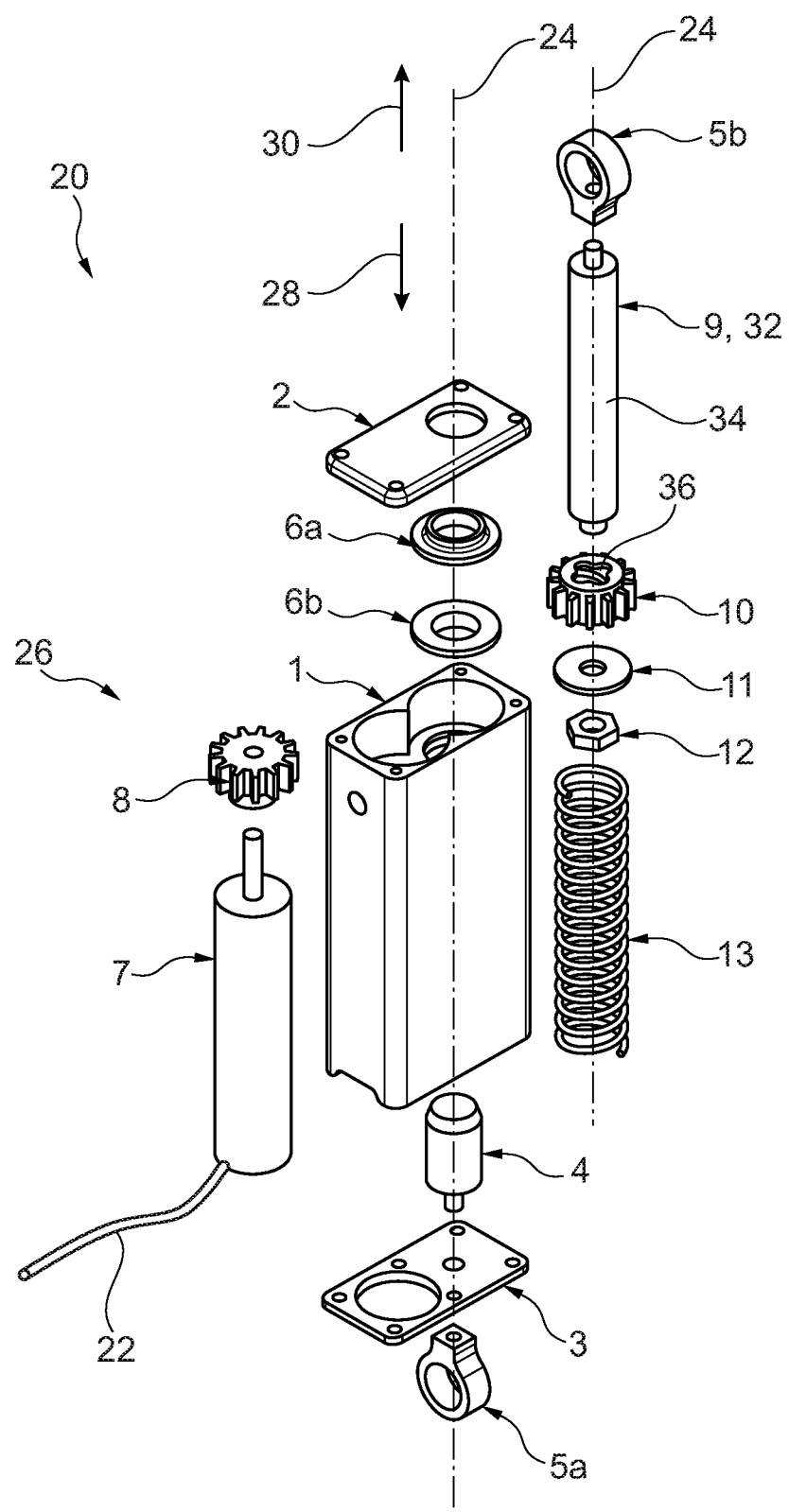
FIG. 1 is a diagrammatic, exploded, perspective view of an actuator according to the invention.
Figure 2:
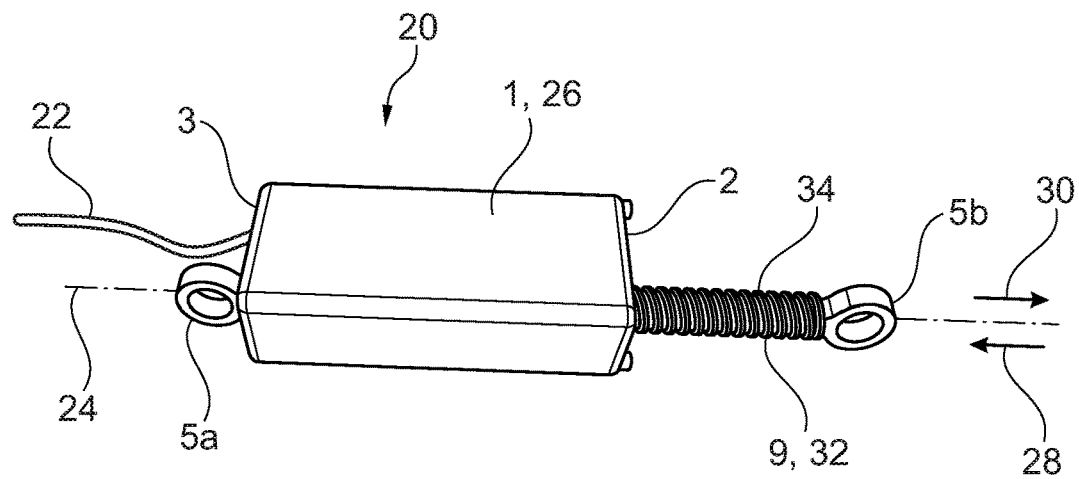
FIG. 2 is a perspective view of the fully-assembled actuator of FIG. 1.

Referring now to the figures of the drawings in detail and first, particularly, to FIGS. 1 and 2 thereof, there is seen an actuator 20 in an exploded illustration and in an assembled state for one possible concept of implementation of the invention.

A housing 1 enables a motor 7, in this case a motor unit, a top cover 2 and a bottom cover 3 to be screwed together. Form-locking installation of a plain bearing 6b is furthermore enabled. In the housing 1 there is an output gearwheel 8 on the motor 7, a drive element 10, in this case a lead screw gearwheel, with an internal mating thread 36 for engagement in an external thread 34 on an actuating body 9, in this case a threaded rod 32, a thrust washer 11, a nut 12, a spring element 13, in this case a compression spring, and a spring pin 4. The housing 1 allows adequate transmission of the waste heat of the motor 7, in this case through the use of metallic materials. The thread 34 and the mating thread 36 are of non-self-locking construction.

The top cover 2 enables a plain bearing 6a to be accommodated in a form-locking manner and is connected to the housing 1 by a screwed joint. The top cover 2 closes off the housing 1 from the environment.

The bottom cover 3 enables the spring pin 4 and a first fastening element 5a, in this case an attachment point, to be accommodated. The bottom cover 3 closes off the housing 1 from the environment but allows through a connection cable 22 for the motor 7, that is to say enables the cable of the motor 7 to be passed out of the housing 1.

The spring pin 4 enables the spring element 13, in this case a compression spring, to be guided. The spring pin 4 contains a thread (not shown specifically) and is screwed to the first fastening element 5a. This screwed joint allows attachment to the bottom cover 3.

A second fastening element 5b, in this case likewise an attachment point, is a mechanical interface with the environment, e.g. a pivoted part, and allows a bolted joint. The second fastening element 5b is screwed to the actuating body 9, in this case the threaded rod 32 in the form of a steep-pitch lead screw. The actuating body 9 can be moved in the actuator 20 along an axial direction 24 (herein illustrated twice because of the exploded illustration).

The second fastening element 5b is a mechanical interface with the environment, e.g. a fixed part, and allows a bolted joint. The fastening element 5a is screwed to the bottom cover 3 by using the spring pin 4.

The plain bearing 6a enables the actuating body 9 to be supported in the radial direction relative to the axial direction 24. The plain bearing 6a enables the drive element 10 to be supported in the axial direction relative to the axial direction 24. The plain bearing 6a is connected form-lockingly to the top cover 2.

The plain bearing 6b enables the actuating body 9 to be supported in the radial direction relative to the axial direction 24. The plain bearing 6b enables the drive element 10 to be supported in the axial direction relative to the axial direction 24. The plain bearing 6b is connected form-lockingly to the housing 1.

The housing 1, the spring pin 4 and both covers 2, 3 form a main body 26, relative to which the actuating body 9 can be moved along the axial direction 24 in a driving direction 28 (along the axial direction 24) and an opposing counter direction 30.

The motor 7 or motor unit includes an electric motor per se and can contain a transmission. The output gearwheel 8 is moved in rotation for motorized actuation of the actuator 20. In the case of spring-driven closure or return, the motor acts in generator mode as an electric-motor brake. The motor 7 damps the movement through the induction of a current, which drops across an electric resistance (not illustrated), e.g. an internal resistance. The motor 7 thus acts as a resistance brake. The cabling (connection cable 22) associated with the motor 7 leads out of the housing 1 and enables attachment to a control unit (not illustrated). The control unit controls the motor 7 and communicates therewith.

The output gearwheel 8 allows power to be transmitted between the motor unit 7 and the drive element 10.

The threaded rod 32, in interaction with the drive element 10, enables a rotary motion to be converted into a linear motion along the axial direction 24. The second fastening element 5b is screwed to the actuating body 9 by using a thread. Through the use of a further thread, the thrust washer 11 is secured on that thread by the nut 12. The threaded rod 32 is supported in the radial direction relative to the axial direction 24 by the plain bearings 6a, 6b. The corresponding axial degree of freedom is maintained. However, the mounted thrust washer 11 prevents the threaded rod 32 from falling out in the state where the threaded rod 32 has been extended.

The drive element 10, in interaction with the threaded rod 32, enables a rotary motion to be converted into a linear motion. The drive element 10 has an internal thread in the form of the mating thread 36, which establishes a flow of force to the threaded rod 32. The drive element 10 is supported in the axial direction relative to the axial direction 24 by the plain bearings 6a, 6b. The rotary degree of freedom is maintained.

The thrust washer 11 enables a flow of force between the threaded rod 32 and the spring element 13. The thrust washer 11 is secured on the threaded rod 32 by the nut 12. The nut 12 secures the thrust washer 11 to the threaded rod 32.

The spring element 13 enables return without the motor. In the driving mode, energy is stored in the spring element 13. The spring element 13 transfers the force to the thrust washer 11. The spring element 13 is supported on the bottom cover 3. The spring element 13 is guided by the spring pin 4 and the housing 1 and prevents critical buckling.

The non-self-locking mechanism is made possible by the threaded rod 32 in the form of a steep-pitch lead screw. The spring element 13 in the form of a return spring is embodied as a compression spring in the actuator 20.

The opening movement in the driving direction 28, during which the actuator retracts, that is to say the fastening elements 5a, 5b move towards one another, is motor-driven by the motor 7, with the rotary motion of the motor being transmitted to the threaded rod 32 through gearwheels (output gearwheel 8) (drive element 10). The drive element 10 is mounted on the threaded rod 32 and moves the latter in a linear manner. Through the use of the thrust washer 11, the spring element 13 is compressed and mechanical energy is stored.

The drive element 10 is retained axially in the axial direction 24 by using bearings or plain bearings 6a, 6b, and therefore there is only a rotary degree of freedom. The same plain bearings 6a, 6b support the threaded rod 9 in the radial direction, and therefore only an axial degree of freedom in the axial direction 24 is allowed.

The non-motorized return is accomplished by using the integrated spring element 13. The spring element 13 transfers the (stored) energy to the steep-pitch lead screw 9 through a thrust washer 11. The nut 12 connects the thrust washer 11 to the threaded rod 32, thereby preventing the rod from being pulled completely out of the housing 1. By virtue of the sufficient thread pitch of the thread 34 and the mating thread 36, the gearwheels (output gearwheel 8) (drive element 10) are driven during the movement in the counter direction 30 by the spring force, which converts the stored energy into the movement of the actuating body 9. Furthermore, or during this process, the gearwheels (output gearwheel 8) (drive element 10) drive the motor 7.

The motor 7 damps the return movement as an electric-motor brake or resistance brake, during which the actuator 20 or actuating body 9 is extended. A speed-dependent and force-dependent current is induced, causing a force which opposes the linear motion in the counter direction 30.

The housing 1 ensures the maximum possible dissipation of waste heat from the motor 7 if thermally conductive materials, e.g. metals, are used. In this way, high-frequency use of the actuator 20 is made possible.

By virtue of the return without the motor (or operating without an active motor drive), it is also possible for the movement to be performed by hand or, with the motor 7 switched off, manually. Thus, this function is of fail-safe construction. The reliability/availability of this function (touchless & manual) is maximized.

The components are integrated within the smallest possible installation space. Existing fastening elements 5a, 5b of objects on which the actuator is mounted are used. By virtue of the modular construction, in particular the use of currently used fastening elements 5a, 5b and installation spaces, installation in a very wide variety of installation situations is possible.

Control is performed by a control unit (not illustrated), which communicates with the motor 7.

Figure 3:
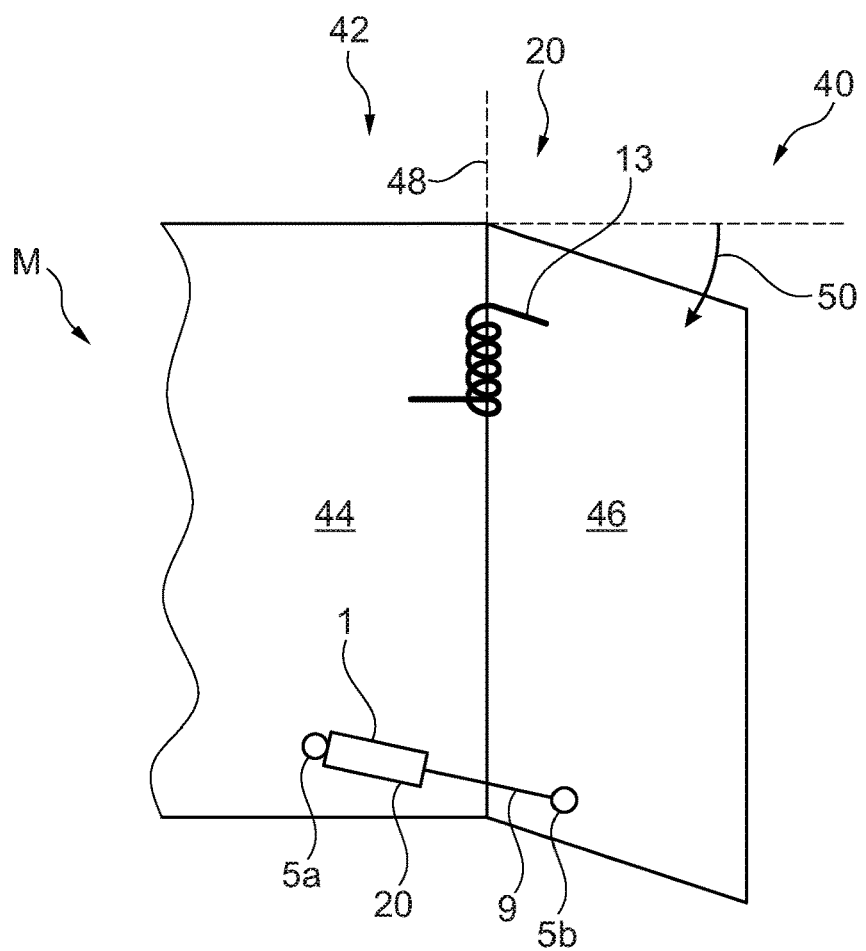
FIG. 3 is a fragmentary, perspective view of an assembly of objects with an alternative actuator.

FIG. 3 shows an assembly of objects 40 with an alternative actuator 20 and an object 42, in this case part of a room of a building. The object 42 contains a fixed part 44 in the form of a building wall and a pivoted part 46 in the form of a door. The door is pivotable about a pivoting axis 48. The actuator 20 is supported on and connected to the fixed part 44 by the first fastening element 5a, and is supported on and connected to the pivoted part 46 by the second fastening element 5b.

In this case, as a departure from the above-described embodiment (FIGS. 1 and 2), the actuator 20 does not contain a spring element 13 within the housing 1. The actuator 20 is a modularly distributed device, the spring element 13 of which is mounted externally, namely on the object 42. In this case, the spring element 13 is a return spring in the form of a helical spring with radially projecting ends, which engage on the fixed part 44 and the pivoted part 46.

The actuator 20 (the spring element 13 and the rest of the actuator) is (are) situated on the object 42 in the correctly mounted state M.

During an opening process of the pivoted part 46, the part 46 is pivoted about the pivoting axis 48 in the direction of an arrow 50, which in this case corresponds to the driving direction, starting from the dashed line indicated in the figure. This movement takes place in a motorized manner by operation of the motor 7 within the housing 1. During this process, the spring element 13 is subjected to stress.

During a closing process of the pivoted part 46, the force of the motor 7 is absent. The stressed spring element 13 moves the pivoted part 46 back counter to the arrow 50. The actuating body 9 is pulled out of the housing 1 and, during this process, the motor 7 is driven. As explained above, the motor acts as a resistance brake in order to damp the movement of the pivoted part 46 counter to the arrow 50.

LIST OF REFERENCE SIGNS 1 housing
2 cover (top)
3 cover (bottom)
4 spring pin
5a, b first, second fastening element
6a, b plain bearing
7 motor
8 output gearwheel
9 actuating body
10 drive element
11 thrust washer
12 nut
13 spring element
20 actuator
22 connection cable
24 axial direction
26 main body
28 driving direction
30 counter direction
32 threaded rod
34 thread
36 mating thread
40 assembly of objects
42 object
44 fixed part
46 pivoted part
48 pivoting axis
50 arrow

The invention claimed is:
1. An actuator, comprising:
first and second fastening elements being actively movable relative to each other;
a main body having said first fastening element;
an actuating body being movable relative to said main body along an axial direction, said actuating body having said second fastening element;
an electric motor configured to actively drive said actuating body exclusively in a driving direction along said axial direction, said electric motor being configured to passively damp a counter movement of said actuating body counter to said driving direction, and said counter movement being brought about by an external action on said fastening elements; and a spring element to be loaded by said movement of said actuating body in said driving direction to preload said actuating body in a counter direction of said counter movement;

said electric motor retracting said actuating body and moving said first and second fastening elements towards one another in an opening movement in said driving direction;

said spring element being compressed and storing mechanical energy in said opening movement and said spring element extending said actuating body and the actuator in a non-motorized return movement.

2. The actuator according to claim 1, wherein said motor is configured to set said damping of said counter movement.

3. The actuator according to claim 1, wherein said motor is an electric-motor brake for damping said counter movement.

4. The actuator according to claim 3, wherein said motor is a resistance brake for said counter movement.

5. The actuator according to claim 1, wherein said fastening elements, said main body, said actuating body and said electric motor form a remainder of the actuator being structurally separate from said spring element, and an interaction between said spring element and said remainder of said actuator is achieved in an object to be operated by said actuator, at least in a correctly mounted state of the actuator.

6. The actuator according to claim 1, wherein said fastening elements, said main body, said actuating body and said electric motor form a remainder of the actuator, and said spring element is integrated into said remainder of the actuator.

7. The actuator according to claim 1, wherein said spring element is configured to be subjected to compressive stress by a movement in said driving direction.

8. The actuator according to claim 1, wherein:
said actuating body contains a threaded rod with a thread;
a drive element has a mating thread being coupled by motion to said threaded rod and said motor; and
said thread and said mating thread have a non-self-locking construction.

9. An object assembly, comprising:
an actuator according to claim 1; and
an object.

10. The object assembly according to claim 9, wherein said object contains a fixed part and a pivotable part being pivotable relative to said fixed part about a pivoting axis, one of said fastening elements is attached to said fixed part and another of said fastening elements is attached to said pivotable part.

11. The object assembly according to claim 10, wherein said spring element is mounted to engage said fixed part and said pivotable part for preloading said pivotable part in a pivoting direction corresponding to said counter direction.

* * * * *